June 12, 1928.

L. CAMPBELL, JR

ADAPTER FOR TUBULAR MEMBERS

Filed Dec. 30, 1926

1,672,879

Inventor
Lorn Campbell Jr.
By Hull Brock & West
Attorney

Patented June 12, 1928.

1,672,879

UNITED STATES PATENT OFFICE.

LORN CAMPBELL, JR., OF LAKEWOOD, OHIO, ASSIGNOR TO THE HARRIS CALORIFIC COMPANY, OF CLEVELAND, OHIO, A CORPORATION OF OHIO.

ADAPTER FOR TUBULAR MEMBERS.

Application filed December 30, 1926. Serial No. 158,017.

This invention relates to connections which are known to the trade as adapters and which are employed for the purpose of effecting a connection or union between two tubular members of different diameter through which gas or liquid under comparatively high pressure is conducted. Such adapters or connectors are used, for instance, in connecting gas regulators with cylinders, distributing pipes, tubes etc. having different connections. It will be understood, however, that the adapters shown herein are capable of more general use than the one referred to specifically.

Adapters or connectors of the type referred to have usually been made in either one or three pieces, both of which have proven more or less unsatisfactory. The one piece type lacks the swivel feature which necessitates the use of washers which leak after being used once. In the three-piece type two of the parts are screwed together and soldered to render them gas tight. Making adapters of three-piece type is a slow operation and involves considerable expense; and, when such adapters are finished, the soldered connections are liable to be loosened in making use of the adapters, thus causing a leakage of gas therethrough.

It is the general purpose and object of my invention to provide an adapter which can be manufactured quickly and at comparatively small cost; which may be conveniently applied to the parts to be connected and which, when so applied, will maintain leakproof joints without the use of washers, which are liable to leakage.

While one form of the invention is shown in the accompanying drawings, it will be understood that I do not limit myself to the exact features of construction shown herein but various methods can be used which are within the scope of the appended claims.

Figure 1:
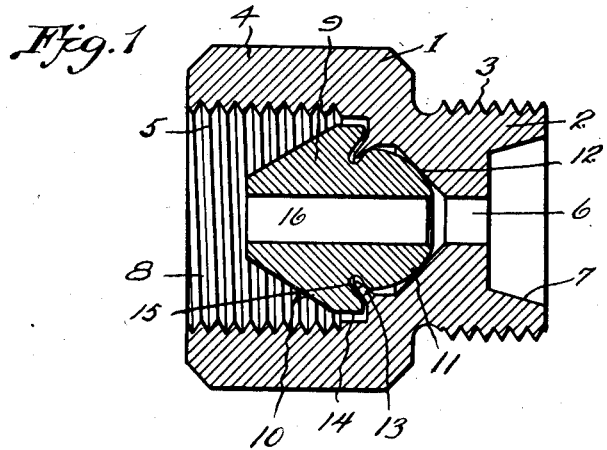
Figure 2:
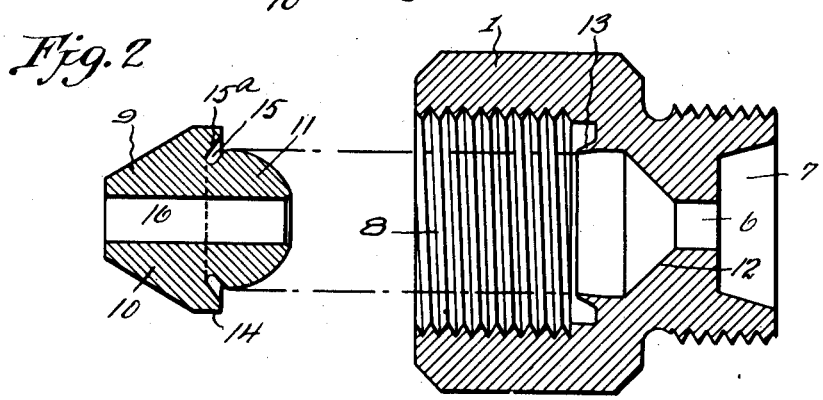

I accomplish the general objects referred to in and through the construction and arrangement of parts shown in the drawings, wherein Fig. 1 is a central longitudinal section through an adapter constructed in accordance with my invention; Fig. 2 a view similar to Fig. 1, showing the two members of such adapter prior to their assembly; and Fig. 3 a view, similar to Fig. 1, showing a modified form of my invention.

Describing the various parts by reference characters, 1 denotes the body of the adapter, the said body having a reduced end 2 provided with an external thread 3 and an enlarged end 4 provided with an internal thread 5. 6 denotes a central bore which communicates at one end with a chamber having a tapered seat 7 for one of the tubular members with which the adapter is to be used and at its other end with a chamber 8 into which the end of the other tubular member is to be threaded.

Figure 3:
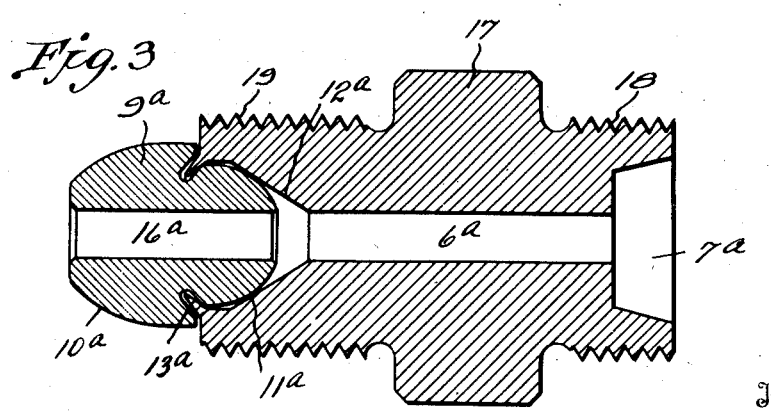

In order to form the leak-proof joint and to accommodate any eccentricities that may exist between the threaded parts to be connected, there is provided a seating body 9 having one end thereof tapered in frusto-conical shape, as shown at 10, and its other end tapered in rounded or spherical shape, as shown at 11. The seating portion 11 cooperates with a tapered seat 12 provided in the bottom of the chamber 8 and extending outwardly from the adjacent end of the bore 6. In order to secure the body 10 in place in such manner as to enable it to obtain a limited swiveled movement, such as will accommodate the eccentricities between the threaded connected parts, the body 1 is provided with an annular lip 13, the diameter of the lip being sufficient to enable the spherical or rounded part 11 of the seating body to pass therethrough (see Fig. 2). The body 9 is provided with a shoulder 14 beyond the rounded portion 11 thereof, which shoulder is of considerably greater diameter than the diameter of the lip 13; and the body is provided, at the junction of the rounded part 11 and the said shoulder with an annular slot 15, the wall 15ª whereof which is beyond the rounded part 11 being inclined toward the bore 16 thereof in a direction so that, when the said body is forced to the bottom of the chamber 8, the action of this inclined face upon the lip 13 will cause the latter to be bent inwardly, as shown in Figs. 1 and 3, thereby contracting the internal diameter of the lip and causing the body 9 to be secured thereto. The slot 15 is of such width as to enable a limited amount of swivelling adjustment of the body 9 with reference thereto, whereby the portion 10 may form a tight seat with the adjacent end of the tubular member to which the adapter is connected while the portion 11 also forms a tight seat against the tapered wall 12.

The seating body 9, being thus self-adjusting, enables a tight and leak proof joint to be formed at all times between the two tubular members which are connected by the adapter.

In Fig. 3 there is shown a form of my invention which differs from that shown in Figs. 1 and 2 in that the body 17 is externally threaded at both ends thereof, as shown at 18 and 19 whereby the adapter is enabled to form a proper union between two tubular members having internally threaded ends adapted to be applied to the parts 18 and 19. The body 17 is provided with a central bore or passage 6ª corresponding to the passage 6 and with tapered walls 7ª and 11ª corresponding respectively to the walls 7 and 11 in Figs. 1 and 2. The end of the body 17 is provided with a lip 13ª corresponding to the lip 13 in the preceding views. The seating body 9ª in this case is shown as having both of its ends 11ª and 10ª as rounded and as tapering or diminishing in diameter toward the ends thereof.

Having thus described my invention, what I claim is:—

1. An adapter for connecting tubular members, the said adapter comprising a body having a bore for the passage of fluid, the said body having a seat beyond one end of said bore, a seating body having a bore therethrough adapted to register with the first mentioned bore and having a swiveled connection with the first mentioned body and being provided at one end with a portion which is adapted to engage said seat and at its opposite end with a portion adapted to form a seat with one of the said tubular members, the first mentioned body being provided with means for securing the tubular members thereto.

2. An adapter for connecting tubular members, the said adapter comprising a body having a bore for the pasage of fluid, the said body having a seat beyond one end of said bore, a seating body having a bore therethrough adapted to register with the first mentioned bore and having a swiveled connection with the first mentioned body and being provided at one end with a rounded portion which is adapted to engage said seat and at its opposite end with a tapered portion adapted to form a seat with one of the said tubular members, the first mentioned body being provided with threads for securing the tubular members thereto.

3. An adapter for connecting tubular members, the said adapter comprising a body having a bore for the passage of fluid, the said body having seats at opposite ends of said bore, a seating body having a bore therethrough adapted to register with the first mentioned bore and having a swiveled connection with the first-mentioned body and having a rounded seat-engaging portion adjacent one end thereof adapted to engage one of the said seats and provided adjacent its opposite end with a tapered portion adapted to form a seat with one of the tubular members, the first mentioned body being provided with means for securing the tubular members thereto.

4. An adapter for connecting tubular members, the said adapter comprising a body having a bore for the passage of fluid, the said body having outwardly flaring seats at opposite ends of said bore, a seating body having a bore therethrough adapted to register with the first mentioned bore and having a swiveled connection with the first-mentioned body and having a rounded seat-engaging portion adjacent one end thereof adapted to engage one of the outwardly flaring seats and provided adjacent its opposite end with a tapered portion adapted to form a seat with one of the tubular members, the first mentioned body being provided with threads for securing the tubular members thereto.

5. An adapter for connecting tubular members, the said adapter comprising a body having a bore for the passage of fluid, the said body having a seat beyond one end of said bore, a seating body having a bore therethrough adapted to register with the first-mentioned bore and having a seat-engaging portion adjacent one end thereof adapted to engage the said seat and having its opposite end provided with a seat-engaging portion, the seating body being provided with a circumferential slot and the first mentioned body having a rib projected into said slot, thereby to form a swiveled connection between the first mentioned body and the seating body, the first mentioned body being provided with means for securing the said tubular members thereto.

6. An adapter for connecting tubular members, the said adapter comprising a body having a bore for the passage of fluid, the said body having a seat beyond one end of said bore, a seating body having a bore therethrough adapted to register with the first mentioned bore and having a seat-engaging portion adjacent one end thereof adapted to engage the said seat and having its opposite end provided with a seat-engaging portion, the seating body being provided with a circumferential slot between the two seat-engaging portions thereof, the said slot extending at an angle with respect to the said bore and the seating body being provided with an outwardly extending shoulder on the side of the slot which is remote from the said seat, the first-mentioned body having a rib projecting therefrom which rib is adapted to be engaged by the said shoulder and forced thereby into said slot thereby to retain the seating body in operative relation to the said seat and in operative relation to the cooperating tubular member, the first mentioned body being provided with means for securing the tubular members thereto.

7. An adapter for connecting tubular members, the said adapter comprising a body having a bore for the passage of fluid, the said body having a seat beyond one end of said bore, a seating body having a bore therethrough adapted to register with the first-mentioned bore and having a rounded seat-engaging portion adjacent one end thereof adapted to engage the said seat and having its opposite end provided with a tapered seat-engaging portion, the seating body being provided with a slot extending therearound, and the first mentioned body having a rib projected into said slot thereby forming a swivel connection between the first mentioned body and the seating body, the first mentioned body being provided with threads for securing the said tubular members thereto.

8. An adapter for connecting tubular members, the said adapter comprising a body having a bore for the passage of fluid, the said body having a seat beyond one end of said bore, a seating body having a bore therethrough adapted to register with the first mentioned bore and having a rounded seat-engaging portion adjacent one end thereof adapted to engage the said seat and having its opposite end provided with a tapered seat-engaging portion, the seating body being provided with a slot extending therearound between the two seat-engaging portions thereof, the said slot extending at an angle with respect to the said bore and the seating body being provided with an outwardly extending shoulder on the side of the slot which is remote from the said seat, the said first mentioned body having a rib projecting therefrom which rib is adapted to be engaged by the said shoulder and forced into said slot, thereby to retain the seating body in operative relation to the said seat and in operative relation to the co-operating tubular member, the first mentioned body being provided with threads at opposite ends thereof for securing the tubular members thereto.

9. An adapter for connecting tubular members, the said adapter comprising a body having a bore for the passage of fluid, the said body having a seat beyond one end of said bore, a seating body having a bore therethrough adapted to register with the first mentioned bore and having a swiveled connection with the first mentioned body and being provided at one end with a portion which is adapted to engage said seat and at its opposite end with a portion adapted to form a seat with one of the said tubular members, the first mentioned body being provided with means for securing the tubular members thereto, the said swiveled connection serving to retain the seating body within the first mentioned body.

10. An adapter for connecting tubular members, the said adapter comprising a body having a bore for the passage of fluid, the said body having a seat beyond one end of said bore, a second body having a bore therethrough adapted to register with the first-mentioned bore and having a seat-engaging portion adjacent one end thereof adapted to engage the said seat and having its opposite end provided with a seat-engaging portion, one of said bodies being provided with a circumferential slot and the other having a rib projected into said slot thereby to form a swivel connection between the first mentioned body and the second mentioned body, the first mentioned body being provided with means for securing said tubular members thereto.

In testimony whereof, I hereunto affix my signature.

LORN CAMPBELL, Jr.